United States Patent [19]

Charchian et al.

[11] 4,075,902
[45] Feb. 28, 1978

[54] VARIABLE SPEED PULLEY

[75] Inventors: Loris J. Charchian, Troy; Larry E. Marvin, St. Clair Shores, both of Mich.; George R. Boxhorn, West Allis, Wis.

[73] Assignee: Dana Corporation, Toledo, Ohio

[21] Appl. No.: 727,058

[22] Filed: Sep. 27, 1976

[51] Int. Cl.² ............................................. F16H 55/52
[52] U.S. Cl. .............................. 74/230.17 C; 403/358
[58] Field of Search ............... 74/230.17 C, 230.17 B, 74/230.17 A, 230.17 R, 230.17 M, 230.17 E; 403/358, 356, 318

[56] References Cited

U.S. PATENT DOCUMENTS

| 1,929,533 | 10/1933 | Knowlton | 403/358 |
|---|---|---|---|
| 2,937,042 | 5/1960 | Wilder | 74/230.17 C |
| 2,952,161 | 9/1960 | Williams | 74/230.17 C |
| 3,428,343 | 2/1969 | Downie | 403/358 |
| 3,436,106 | 4/1969 | Luenberger | 403/356 |

FOREIGN PATENT DOCUMENTS 357,967   1/1906   France ................... 403/358

Primary Examiner—Samuel Scott
Assistant Examiner—Allan R. Burke
Attorney, Agent, or Firm—Oliver E. Todd, Jr.; Robert E. Pollock

[57] ABSTRACT

An improved variable speed pulley for adjusting the drive ratio between two shafts interconnected through two pulleys and a V-belt. The variable speed pulley has a hub which is attached through to one shaft with a collet. A number of keys of generally square cross sections with two opposed chamfered corners are located at each end of the hub in V-shaped axially directed keyways spaced around the periphery of the hub and in correspondingly spaced V-shaped keyways around interior openings through each of two sheave halves to permit axial movement of the sheave halves on the hub. Bushings retain the four keys within each sheave half. The bushings and the keys are of a compliant material to prevent fretting corrosion. The keys engage the bushings to prevent the bushings from rotating with respect to the sheave half and hub. A helical spring located within a spring housing is compressed between each sheave half and an adjacent one of two retainer rings located in grooves near each end of the hub. The springs urge the sheave halves together with a predetermined force. In a modified embodiment of the pulley, one sheave half is fixed to the hub.

12 Claims, 8 Drawing Figures

VARIABLE SPEED PULLEY

This invention relates to pulleys and, more particularly, to an improved variable speed sheave or pulley of the type in which the pulley diameter is adjusted by changing the axial spacing of two sheave halves.

Variable speed pulleys are commonly used in devices which require an adjustable drive ratio between a drive shaft and a driven shaft. Such pulleys are used, for example, as a variable drive ratio transmission in factories such as textile mills as spinning frame drives, and in buildings as ventilation fan drives, where variable speed outputs are required from a constant speed drive shaft. The variable speed pulley generally consists of two sheave halves which are attached to a hub or a shaft such that both sheave halves rotate with the shaft and at least one sheave half is keyed to slide axially on the shaft. At least one spring biases the two sheave halves together. An endless V-belt having a predetermined length is positioned to extend from between the sheave halves of the variable speed pulley and a fixed pulley on a second shaft. The belt will assume a position on the variable speed pulley determined by the spacing between the two shafts. As the two shafts are moved apart, the sheave halves separate against the spring tension, resulting in a decreasing effective diameter for the variable speed pulley. Similarly, the sheave halves will move together and the variable speed pulley will assume a larger effective diameter as the two shafts are moved apart.

Various problems have occurred with prior art variable speed pulleys. One problem area has been the cost of construction which has made prior art variable speed pulleys uneconomical for many potential applications. For applications which involve higher speeds, the pulley must be dynamically balanced. Prior art designs have made it difficult and expensive to manufacture a dynamically balanced variable speed pulley which will maintain such balance during its operating life. One of the most common maladies that affects variable speed pulleys is fretting corrosion. This problem occurs at the interface between the hub or shaft and those parts to which it delivers torque. Fretting corrosion is not well understood. It can occur whenever there is microscopic motion between two surfaces and, when this happens, traditional lubrication methods for preventing wear are ineffective. In pulleys having adjustable sheaf halves, fretting corrosion usually occurs when the unit is run in one position for long periods of time, such as in textile mills. Wear ridges develop between the sliding surfaces to such an extent that the pulley becomes inoperative. When conventional material such as cast iron and steel are used, the only proven method for minimizing this problem is through diligent re-lubrication and periodic running of the pulley through its operating range in order to recoat the sliding surfaces with a lubricant and to burnish off any developing wear ridges.

In recent years, manufacturers of variable speed pulleys have attempted to eliminate the problem of fretting corrosion through various methods, such as sealed ball bearings, sealed oil reservoirs and compliant interfaces. The ball bearing approach is expensive and sometimes unsuccessful. The oil reservoir is a very successful method, but prone to leakage. The most popular approach appears to be the compliant interface. The philosophy here is to separate the two surfaces which are prone to fretting with a compliant material which absorbs the microscopic motion, not in sliding between the surfaces, but rather in internal shear. Typical prior art variable speed pulleys using a compliant material to prevent fretting corrosion are shown, for example, in U.S. Pat. No. 3,122,384 which issued Feb. 25, 1964 to Luenberger, U.S. Pat. No. 3,436,106, which issued Apr. 1, 1969 to Luenberger, and U.S. Pat. No. 3,739,651 which issued June 19, 1973 to Lewis. The pulleys in each of these patents includes at least one non-metallic insert formed from a self-lubricating material positioned between a hub and a sheave half which slides axially on the hub. Keys are molded integrally with the non-metallic inserts shown in the above-mentioned U.S. Pat. Nos. 3,122,384 and 3,739,651 and a separate key of a self-lubricating material is provided in the pulley of U.S. Pat. No. 3,436,106 limiting the sheave halves to axial motion on a hub or shaft on which the sheave halves are mounted. Since the non-metallic keys have a lower shear strength than metallic keys, U.S. Pat. No. 3,436,106 suggests providing a "V" or a "W" cross section to the key to increase the shear area without significantly increasing the height of the key. Pulleys of the type shown in these patents have been fairly successful at reducing fretting corrosion. However, the pulleys have generally been of the type having a single axially movable sheave half and a fixed sheave half. Furthermore, the pulleys have not solved some of the other prior art problems such as problems relating with dynamic balance during operation and production and maintenance cost problems.

According to the present invention, an improved variable speed sheave or pulley is provided for adjusting the drive ratio between a drive shaft and a driven shaft. The pulley includes two sheave halves mounted on a hub which is, in turn, attached to one of the shafts by means of a collet. At least one of the sheave halves is keyed to the hub with four or more keys of generally square cross sections with two opposed chamfered corners. The keys are located between the sheave half and in V-shaped axially directed keyways spaced around the periphery of the hub and similar V-shaped keyways correspondingly spaced around an interior hub opening through the sheave half. The keys restrict the sheave half to axial movement on the hub. Bushings are provided as bearings between the sheave half and the hub and for retaining the keys within the sheave half. The keys engage and inhibit rotation of the bushings with respect to the hub and the sheave half. The second sheave half either is fixed to the hub or is keyed to the hub in a similar manner. The hub and the sheave halves are formed of a relatively hard metallic material, and the keys and bushings are formed from a self-lubricating non-metallic material such as a filled nylon or ultra-high molecular weight polyethylene. The bushings and the keys provide compliant interfaces between the sheave halves and the hub to eliminate fretting corrosion.

A separate spring assembly is positioned between each of the keyed sheave halves and a retainer ring which is located in a groove near the adjacent end of the hub. Each spring assembly includes a helical compression spring located within two telescoping cover sections. The cover sections are keyed to the hub and sheave half to prevent rotation of the spring assembly with respect to the hub and sheave half. Detents prevent rotation of the spring within the cover sections. The two sheave halves and the spring assemblies can be individually dynamically balanced so that the variable speed pulley will remain balanced after maintenance operation, such as replacing a defective component.

Accordingly, a primary object of the invention is to provide an improved variable speed pulley.

Another object of the invention is to provide a variable speed pulley in which fretting corrosion is prevented.

Still another object of the invention is to provide a low-cost variable speed pulley which may be readily disassembled and reassembled during servicing without changing the dynamic balance of the pulley.

Other objects and advantages of the invention will become apparent from the following detailed description, with reference being made to the accompanying drawings.

Figure 1:
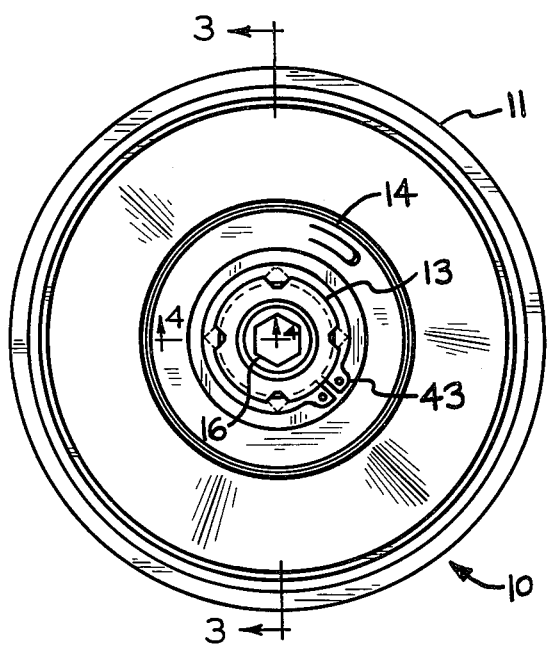
FIG. 1 is an end elevational view of a variable speed pulley constructed in accordance with the present invention.
Figure 2:
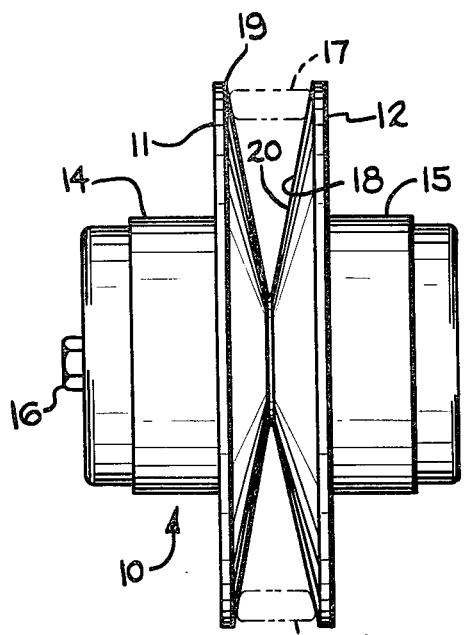
FIG. 2 is a side elevational view of the pulley of FIG. 1.

Turning now to the drawings, and particularly to FIGS. 1 and 2, a variable speed pulley 10 is shown in accordance with the present invention. The pulley 10 generally includes first and second sheave halves 11 and 12 which are mounted on a hub 13. A spring assembly 14 is positioned to bias the sheave half 11 towards the sheave half 12 and a similar spring assembly 15 is positioned to bias the sheave half 12 towards the sheave half 11. The hub 13, the sheave halves 11 and 12, and the spring assemblies 14 and 15 are keyed together so that all components of the variable speed pulley 10 rotate as a single unit. A suitable bolt 16 is provided for attaching the pulley 10 to a shaft (not shown) either by threadably engaging an end of such shaft or by causing a collet to clamp onto such shaft, as will be discussed in greater detail below. During operation of the pulley 10, a V-belt 17 is positioned within a groove 18 which is defined by surfaces 19 and 20 on the sheave halves 11 and 12, respectively. Normally, the belt 17 will lie in the groove 18 and extend about 180° around the pulley 10. As the belt 17 is forced deeper into the groove 18 by an increased belt tension, the sheave halves 11 and 12 separate against the forces of spring assemblies 14 and 15 to decrease the effective diameter of the pulley 10. Conversely, as tension on the belt 17 is relieved, the spring assemblies 14 and 15 force the sheave halves 11 and 12 together to increase the effective diameter of the pulley 10.

Referring now to FIGS. 3-6, details are shown for the variable speed pulley 10. The hub 13 generally consists of a tubular steel member having an internal opening 25 extending completely therethrough. The opening 25 has an outwardly tapered end 26 and, near an opposite end 27 of the hub 13, a radially inwardly directed flange 28. A collet 29 is positioned within the hub opening 25 and engages a shaft represented by the dashed line 30. The bolt 16 passes through a washer 31 which abuts the flange 28 and is threaded into an opening 32 in the collet 29. As the bolt 16 is tightened, it pulls the collet 29 into the hub opening 25. An O-ring 23 is shown positioned in an annular groove 24 about the collect 29. The O-ring 23 eliminates any loose fit between the collet 29 and the hub opening 25 and forces concentricity. Also, the O-ring 23 reduces fretting action between the collet 29 and the hub 13. The collet 29 includes a cylindrical center opening for receiving the shaft 30. The collet terminates at an outwardly tapered end 34 which conforms with the tapered hub end 26. A plurality of longitudinal slots 35 are formed on the collet 29 to extend from the end 34. As a consequence, when the bolt 16 is tightened to pull the collet 29 into the hub opening 25, the tapered collet end 34 is forced radially inwardly by the tapered end 26 of the hub opening 25. The inward movement of the collet end 34 grips the shaft 30 to hold the pulley 10 firmly in place.

The hub 13 has a smooth cylindrical outer surface 36 on which slide four bearings 37 for the sheave halves 11 and 12. The bearings 37 are positioned between the sheave halves 11 and 12 and the hub surface 36 and are formed from a non-metallic, compliant material. Preferably, the bearings 37 are formed from a self-lubricating material such as a Molydisulphide filled nylon. Four longitudinal V-shaped keyways 38 are formed in the exterior surface 26 of the hub 13. The keyways 38 are parallel to the axis of the hub 13 and extend the entire length of the hub 13. Eight keys 39 are positioned partially within the keyways 38. Four of the keys 39 are positioned between and prevent rotation between the sheave half 11 and the hub 13, and the other four keys 39 are positioned between and prevent rotation between the sheave half 12 and the hub 13. The hub 13 also includes three annular grooves 40, 41 and 42 which extend around its periphery. The grooves 40 and 42 are located adjacent opposite ends 46 and 47 of the hub 13 while the groove 41 is centered on the hub 13. External retainer rings 43 and 44 are positioned within the grooves 40 and 42, respectively, and an O-ring or steel snap ring 45 is positioned within the groove 41. The function of the rings 43-45 will be discussed in detail below.

The sheave half 11 includes a generally tubular sleeve 48 and a radially outwardly directed flange 49 which are cast as a single integral unit. Preferably, the sheave half 11 is cast from aluminum, machined as necessary, and hard anodized to provide a very hard surface coating to the surface 19. On one side, the flange 49 defines the conical surface 19 which forms one side of the V-shaped belt groove 18. The flange 49 is provided with a relatively thin wall thickness to minimize the weight of the sheave half 11. An annular groove 50 is formed in an outer surface 51 of the flange 49 to facilitate dynamic balancing of the sheave half 11. Balancing is accomplished by selectively applying a predetermined mass of lead or similar dense metal to the groove 50. Generally, prior art sheave halves were drilled to remove excess metal for dynamic balancing. This necessitated removing the sheave half from the balancing machine each time additional metal was removed during balancing. Through the use of the groove 50 and adding a mass of lead as a balancing weight, balancing is simplified since the sheave half 11 need not be removed from the balancing machine while a mass of lead is being added.

The tubular sleeve 48 has a stepped central opening having a central portion 52 of a diameter for sliding over the hub 13. Adjacent the surface 19 of the sheave half 11, a larger diameter opening end 53 holds one of the bushings 37. Similarly, a second larger opening 54 is provided adjacent an end 55 of the sleeve 48 for receiving another of the bushings 37. Enlarged diameter annular grooves 56 are provided between each of the bushing openings 53 and 54 and the central sleeve openings 52 for receiving an enlarged diameter flange 57 formed on the bushings 37. The bushing flange 57 acts as an internal retainer ring for holding the bushings 37 within the sleeve openings 53 and 54.

The second sheave half 12 is identical to the sheave half 11 and includes a flange 58 and a generally tubular sleeve 59 which are cast from metal as an integral unit. An annular groove 60 is formed in the flange 58 for receiving a mass of lead or similar metal for dynamically balancing the sheave half 12. The sleeve 59 is provided with a central opening 61 which slides over the hub 13. Enlarged diameter bushing receiving openings 62 are provided at opposite ends of the opening 61 with an annular bushing retaining groove 63 formed in the sleeve 59 between each opening 62 and the opening 61. Again, bushings 37 are positioned within the opening 62 with the bushing flange 57 located in the opening 63 for retaining the bushings within the opening 62 in a manner similar to retaining rings.

Figure 3:
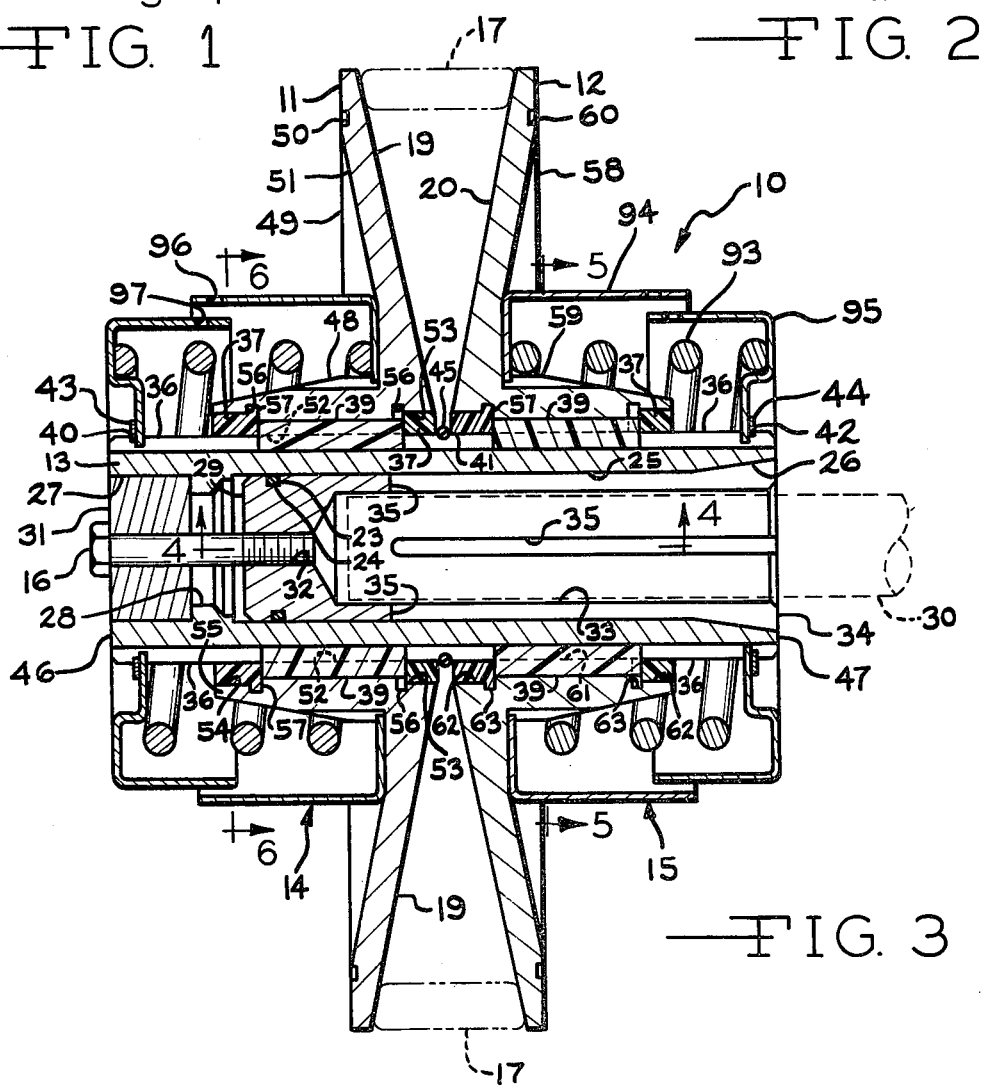
FIG. 3 is a cross sectional view taken along line 3—3 of FIG. 1 and showing the sheave halves biased together to provide a maximum effective pulley diameter.
Figure 5:
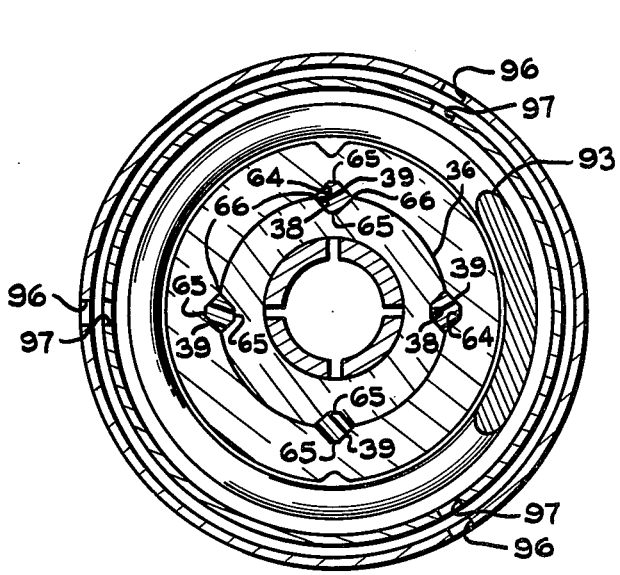
FIG. 5 is a cross sectional view taken along line 5—5 of FIG. 3.
Figure 6:
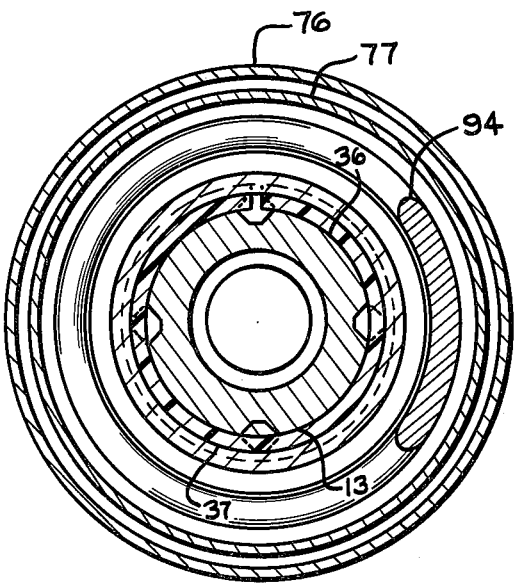
FIG. 6 is a cross sectional view taken along line 6—6 of FIG. 3.

The bushings 37 permit the sheave halves 11 and 12 to slide on the hub 13. The keys 39 inhibit rotational movement between the sheave halves 11 and 12 and the hub 13 without interfering with sliding in an axial direction. As best seen in FIGS. 3 and 5, four V-shaped keyways 64 are formed in the central sleeve openings 52 and 61. The keyways 64 are located to extend parallel to the axis of the pulley 10 and are spaced around the openings 52 and 61 to align with the keyways 38 which extend the length of the hub 13. The keyways 64 in the sheave halves 11 and 12 and the keyways 38 in the hub 13 each have a flattened or truncated bottom to conform with two opposed chamfered edges 65 on each of the keys 39. As best seen in FIG. 5, the keys 39 have a generally square cross section with the two chamfered corners 65 lying in a direction radial from the axis of the pulley 10. The chamfered corners 65 reduce the depth of the keyways 38 and 64 in the hub 13 and the sheave halves 11 and 12, respectively, to minimize the weakening effect of the keyways 38 and 64 in the hub 13 and the sheave halves 11 and 12. The portion of the keyways 38 removed by the chamfered corners 65 does not detract from the strength of the pulley 10 since radial forces are not exerted on the keys 38. On the other hand, the remaining two opposed corners 66 of each key 39, which lie on a circumference about the axis of the pulley 10, are not chamfered since this would reduce the shear area of the keys 39 and, therefore, would reduce the shear strength of the keys 39. It should be appreciated that by orienting the keys 39 as shown, the shear area of the keys 39 is increased by a factor equal to the square root of two times the thickness of the key 39. Therefore, this orientation of the keys 39 is far superior to standard orientation in which the keys are located with two sides tangential to cylinders about the axis of the pulley 10. Furthermore, by orienting the keys as shown, the tendency of the keys to cock or twist in the keyways is greatly reduced over prior art arrangements in which the keys are rotated 45° from the orientation shown.

Figure 4:
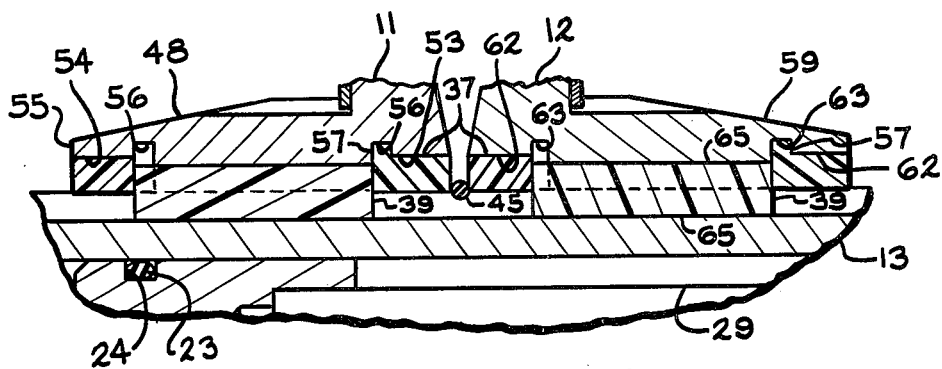
FIG. 4 is an enlarged fragmentary cross sectional view taken along line 4—4 of FIG. 1.
Figure 7:
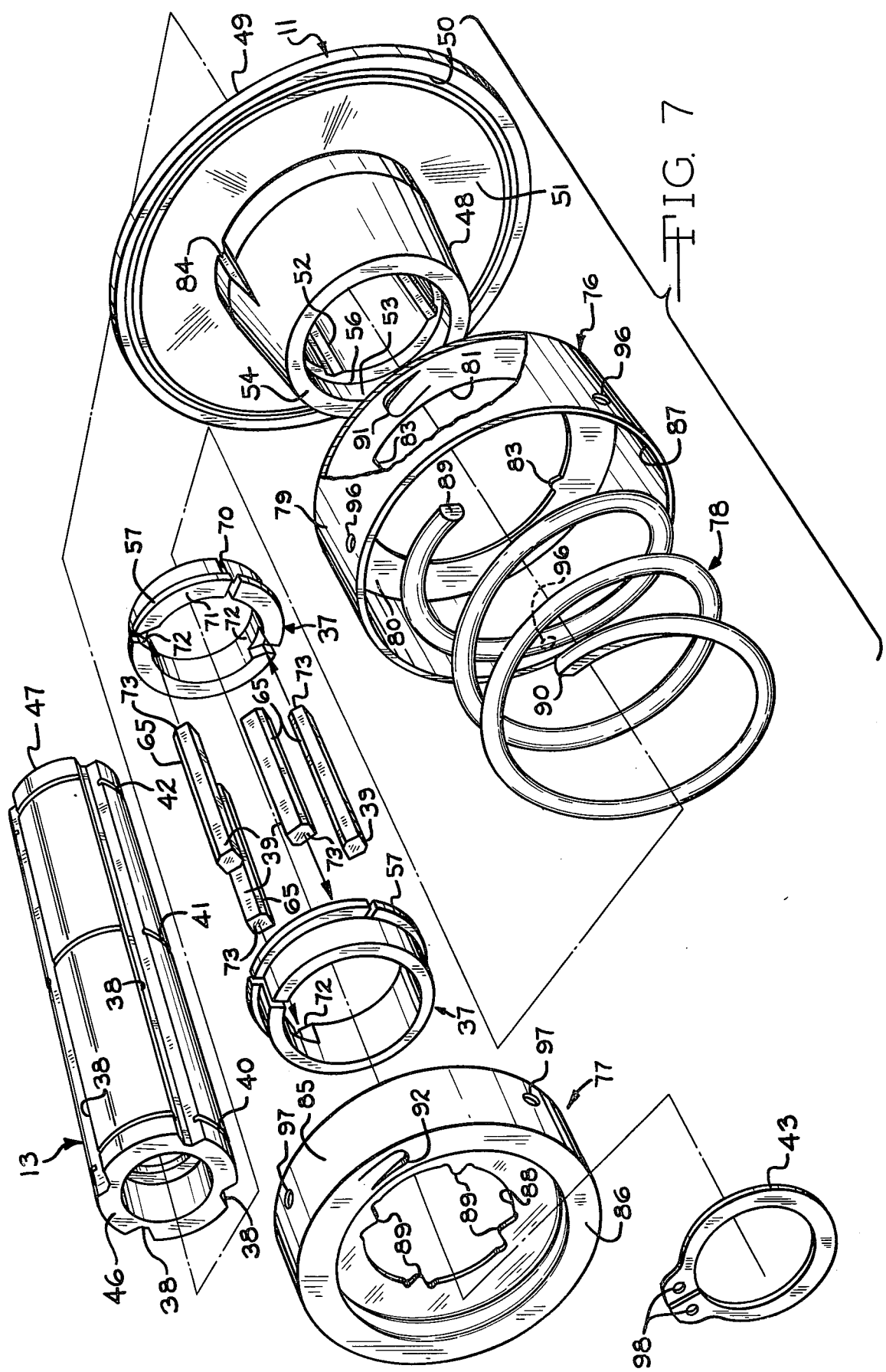
FIG. 7 is an exploded perspective view showing the arrangement of a hub and the components for mounting one sheave half on the hub of a variable speed pulley constructed in accordance with the present invention.

As is best seen in FIGS. 3, 4 and 7, the keys 39 also function to prevent rotation of the bushings 37 with respect to both the sheave halves 11 and 12 and the hub 13. Each of the bushings 37 includes a split or cut 70 which extends radially through the bushing to permit, during assembly of the pulley 10, squeezing the bushing 37 to decrease the diameter of the flange 57 for insertion into the annular grooves 56 and 63. The flange 57 extends radially outwardly from an inner bushing side 71. Two diagonally spaced notches 72 are formed in the inner bushing side 71 for receiving ends 73 of two diagonally spaced keys 39. The two bushings 37 which fit within the openings 53 and 54 of the sleeve 48 are oriented 90° apart so that one of the bushings 37 receives the ends 73 of two diagonally spaced keys 39 and the other of the two bushings 37 receives the ends 73 of the other two diagonally spaced keys 39.

Through this arrangement, the four keys 39 are positioned between two bushings 37 which prevent the keys from moving in an axial direction in the sheave half 11 and a different two keys engage each of the bushings 37 to prevent the bushings 37 from rotating. It should be noted that the two bushings 37 are identical, which minimizes parts inventory and the cost of manufacturing the pulley 10.

Turning now to FIGS. 3, 5 and 7, details are shown for the spring assembly 14. The spring assembly 14 generally comprises an inner spring housing 76 and an outer spring housing 77 which enclose a helical spring 78. The inner spring housing 76 is generally cup shaped and includes a tubular sidewall 79 and an end wall 80. A large diameter opening 81 is provided in the end wall 80 for fitting over and closely engaging an exterior surface 82 on the sleeve 48 of the sheave half 11. A plurality of keys 83 project from the end wall 80 into the opening 81 for engaging similarly shaped keyways 84 formed in the exterior sleeve surface 82. When the keys 83 are aligned with the keyways 84, the inner spring housing 76 slides over the sleeve 48 until the end wall 80 abuts the outer surface 51 of the flange 49. The keys 83 and the keyways 84 then cooperate to prevent rotation of the inner spring housing 76 with respect to the sheave half 11. The outer spring housing 77 is similar to the inner spring housing 76 in that it is generally cup shaped, having a tubular sidewall 85 and an end wall 86. The sidewall 85 is of a slightly smaller diameter than the diameter of an internal opening 87 defined by the inner spring housing sidewall 79 so that the outer spring housing 77 slides telescopically within the inner spring housing 76. The end wall 86 of the outer spring housing 77 is provided with an opening 88 for receiving the hub 13. At least one, and preferably four, keys 89 project inwardly from the end wall 86 into the opening 88 for engaging the keyways 38 formed in the exterior hub surface 36. When the keys 89 on the outer spring housing 77 are aligned with the keyways 38 on the hub 13, the hub 13 slidably passes into the outer housing opening 88. The keys 89 and the keyways 38 then function to prevent the outer spring housing 77 from rotating on the hub 13. Preferably, the keys 83 on the inner spring housing 76 and the keys 39 on the outer spring housing 77 are symmetrically arranged about the openings 81 and 88, respectively, to facilitate dynamic balancing of the spring assembly 14.

The spring 78 is also designed to facilitate balancing the spring assembly 14. The spring 78 is a helical spring having an even number of turns (three complete turns shown in FIG. 7), such that the two spring ends 89 and 90 are axially aligned. When positioned within the inner spring 76, the spring end 89 abuts against a tab 91 formed in the end wall 80. Similarly, the spring end 90 is positioned within the outer spring housing 77 to abut against a tab 92 formed in the end wall 86. The tabs 91 and 92 prevent rotation of the spring 78 with respect to the housings 76 and 77. A primary consideration in selecting the spring 78 is to provide a force on the sheave half 11 which is as constant as possible throughout its operating range. In other words, it is desirable to design the spring 78 to have a very low spring rate. However, the spring rate must be balanced with the load applied to the pulley 10.

The spring assembly 15 is similar to the spring assembly 14 and includes a helical spring 93 positioned between a cup shaped inner spring housing 94 and a cup shaped outer spring housing 95. To simplify manufacturing, the two inner spring housings 76 and 94 are identical, the two outer spring housings 77 and 95 are identical and the springs 78 and 93 are identical. It is important that the spring rate of the two helical springs 78 and 93 be carefully matched. If the springs 78 and 93 are not matched, a change in the pitch diameter of the pulley 10 may result in one of the sheave halves 11 or 12 moving further on the hub 13 than the other. When this happens, the belt becomes misaligned and unacceptable drive performance may result.

At least two, and preferably three or more openings or slots 96 are spaced around the periphery of the sidewall 79 of the inner spring housing 76 and a similar number of slots 97 are spaced around the periphery of the sidewall 85 of the outer spring housing 77. When the spring is slightly compressed between the inner and outer spring housings 76 and 77, pairs of the slots 96 and 97 become aligned. When pins are then inserted into each pair of aligned slots 96 and 97, the spring 78 will be held in the slightly compressed state to facilitate assembly of the pulley 10. The spring assembly 14 with the slightly compressed spring 78 is then inserted onto the hub 13. Next, the external retainer ring 43 is attached to the hub 13 by inserting a suitable tool in two retainer ring openings 98, expanding the ring 43 to pass over the hub end 46 and into the groove 40 and then releasing the retainer ring 43. The pins are then removed from the aligned pairs of slots 96 and 97 to release the spring 78. At this point, the end 90 of the spring 78 presses against the outer spring housing 77 which abuts the external retainer ring 43 and the end 89 of the spring 78 presses against the inner spring housing 76 which in turn forces the sheave half 11 towards the sheave half 12. Axial movement of the sheave half 11 on the hub 13 is limited by the O-ring 45 located within the annular hub groove 41. The sheave half 12 and the spring assembly 15 are similarly positioned on the hub 13 and, while the spring 93 is compressed between the inner spring housing 94 and the outer spring housing 93, the external retainer ring 44 is positioned within the annular groove 42.

Figure 3A:
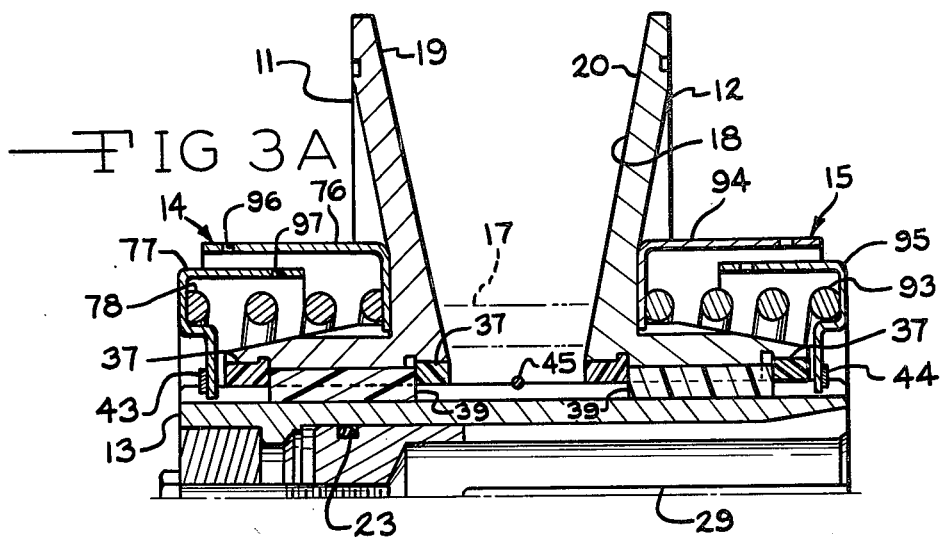
FIG. 3A is a fragmentary cross sectional view similar to FIG. 3, except showing the sheave halves separated by a V-belt to provide a minimum effective pulley diameter.

After the pulley 10 is assembled, it is attached to the shaft 30 as described above. The first step is to select a collet 29 having an internal opening 33 of a suitable diameter for slidably receiving the shaft 30. By using different size collets, the pulley 10 is readily adaptable to different diameter shafts. After the collet 29 is placed on the shaft 30, the bolt 16 is passed through the washer 31 and threaded into the collet opening 32. Upon tightening the bolt 16, the collet 29 tightly engages the shaft 30. The belt 17 is then positioned within the pulley groove 18. For a given length, the V-belt 17 will assume a position within the pulley groove 18 determined by the spacing between the shaft 30 and a fixed diameter pulley on another shaft (not shown) over which the belt 17 passes. If a minimum force is applied to the belt 17, the belt 17 will assume the position shown in FIG. 3, with the sheave halves 11 and 12 biased against the O-ring 45, and the pulley 10 will have a maximum effective diameter. As the shaft spacing is increased, the V-belt 17 is pulled further into the pulley groove 18, causing the sheave half 11 to move against the spring 78 and sheave half 12 to move against the spring 93. At the maximum spacing between the two shafts, the sheave halves 11 and 12 will be deflected to the maximum space position, as shown in FIG. 3A. At this position, the pulley 10 will have a minimum effective diameter.

In a modified embodiment of the variable speed pulley of the present invention, one of the two sheave halves 11 or 12 is fixed to the hub 13. As a consequence, only one of the two sheave halves 11 or 12 will be deflected axially as the tension in the belt 17 is increased. With this embodiment of invention the remaining spring 78 or 93 may be replaced with other known types of springs which offer low spring rates. For example, the spring may be of the slotted disc or diaphragm type. These springs are basically large Belleville springs with fingers extending inwardly. Although expensive, springs of this type offer the advantage of low spring rates and are quite thin compared to a helical spring. However, they are not practical for the variable speed pulley 10 in which both sheave halves 11 and 12 move axially since they are difficult to maintain in a balanced condition so that both sheave halves 11 and 12 will move uniformly on the hub 13.

Although specific embodiments of invention have been described, it will be appreciated that various modifications and changes may be made in the variable speed pulley without departing from the spirit and the scope of the following claims.

We claim:

1. A variable speed pulley for use with a rotatable shaft comprising, in combination, a tubular hub, means for attaching said hub to rotate about an axis with such shaft, said hub having at least two substantially V-shaped keyways spaced symmetrically about an outer surface and extending parallel to such axis, first and second sheave halves each having a tubular sleeve and an integral annular flange defining a conical surface, said conical surface on each sheave half defining one side of a V-belt receiving groove, said sheave half sleeves each having a central opening for slidably receiving said hub, means attaching said first sheave half sleeve to said hub whereby said first sheave half rotates with said hub, means attaching said second sheave half sleeve to said hub including a separate substantially V-shaped keyway in said second sheave half sleeve opening associated with each of said hub keyways, each of said associated hub and sleeve keyways cooperating to define a key receiving opening of generally square cross section, an elongated key formed from a non-metallic compliant material positioned in each key receiving opening, means for retaining said keys within said second sheave half sleeve whereby said second sheave half and said keys are free to slide axially on said hub, and springs mean biasing said second sheave half towards said first sheave half.

2. A variable speed pulley for use with a rotatable shaft, as set forth in claim 1, and further including two bushings formed from a non-metallic compliant material positioned in said second sheave half sleeve opening between said second sheave half and said hub, and wherein said keys are positioned between said bushings whereby said bushings retain said keys within said second sheave half sleeve.

3. A variable speed pulley for use with a rotatable shaft, as set forth in claim 2, and further including means for retaining said bushings within said second sheave half sleeve openings.

4. A variable speed pulley for use with a rotatable shaft, as set forth in claim 3, and including means on each bushing engaging at least one of said keys for preventing said bushing from rotating within said sheave half.

5. A variable speed pulley for use with a rotatable shaft, as set forth in claim 1, wherein said first sheave half is identical to said second sheave half and includes a separate substantially V-shaped keyway in said first sheave half sleeve opening associated with each keyway on said hub, each of said associated hub and first sheave half sleeve keyways cooperating to define a key receiving opening of generally square cross section, wherein said means attaching said first sleeve half to said hub includes an elongated second key formed from a non-metallic compliant material for each key receiving opening, means for retaining said second keys within said first sheave half sleeve whereby said first sheave half and said second keys are free to slide axially on said hub, and further including spring means biasing said first sheave half towards said second sheave half.

6. A variable speed pulley for use with a rotatable shaft, as set forth in claim 5, wherein each of said generally V-shaped keyways in said hub and in said sleeves has a truncated bottom, and wherein said keys are chamfered to fit within said keyways.

7. A variable speed pulley for use with a rotatable shaft, as set forth in claim 5, wherein said spring means for biasing said second sheave half toward said first sheave half and said spring means for biasing said first sheave half towards said second sheave half each comprises a helical spring, said helical springs having identical predetermined spring rates.

8. A variable speed pulley for use with a rotatable shaft, as set forth in claim 7, wherein said hub has first and second ends, a radially inwardly directed annular groove adjacent said first hub end and a radially inwardly directed annular groove adjacent said second hub end, and further including a first external retainer ring positioned within said first hub groove and a second external retainer ring positioned within said second hub groove, and wherein one of said springs is positioned between said first retainer ring and said first sheave half and the other of said springs is positioned between said second retainer ring and said second sheave half.

9. A variable speed pulley for use with a rotatable shaft, as set forth in claim 5, and further including four bushings formed from a non-metallic compliant material, a first two of said bushings positioned in said first sheave half sleeve opening between said first sheave half and said hub, the other two of said bushings positioned in said second sheave half sleeve opening between said second sheave half and said hub, and wherein said keys in each sheave half sleeve are positioned between the bushings in such sleeve whereby said bushings retain said keys within said sleeves.

10. A variable speed pulley for use with a rotatable shaft, as set forth in claim 9, and further including means for retaining said bushings within said sleeves.

11. A variable speed pulley for use with a rotatable shaft, as set forth in claim 9, and including means on each bushing engaging at least one of said keys for preventing said bushings from rotating within said sheave halves.

12. A variable speed pulley for use with a rotatable shaft, as set forth in claim 11, and further including means for retaining said bushings within said sleeves.

* * * * *